Patented June 19, 1923.

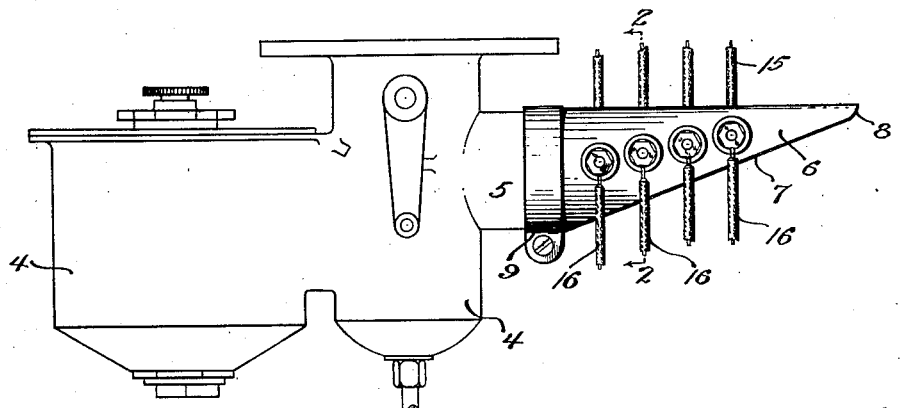
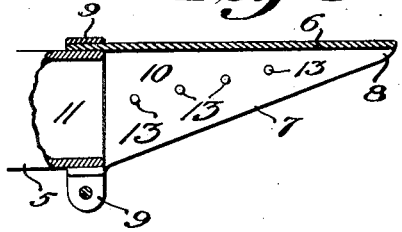
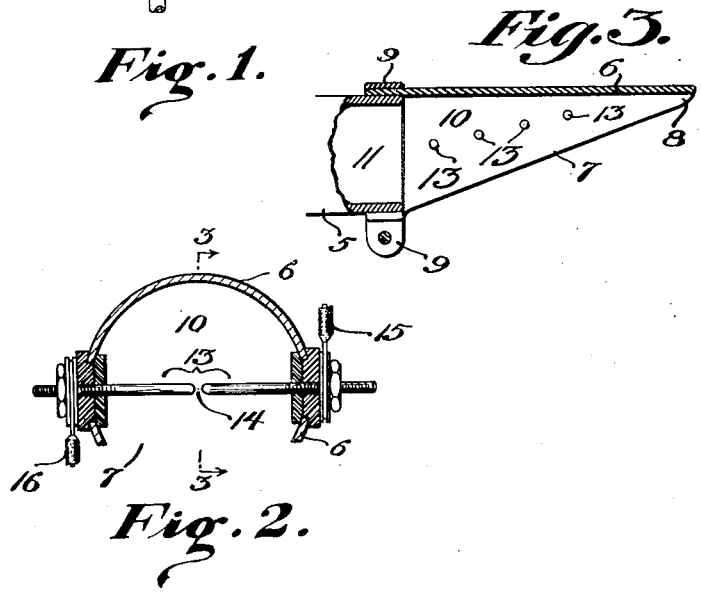

1,459,306

UNITED STATES PATENT OFFICE.

ISAMI KODAMA, OF PHILADELPHIA, PENNSYLVANIA.

FUEL DEVICE FOR INTERNAL-COMBUSTION ENGINES.

Application filed August 18, 1920. Serial No. 404,473.

*To all whom it may concern:*

Be it known that I, ISAMI KODAMA, a subject of the Emperor of Japan, residing at Philadelphia, in the county of Philadelphia and State of Pennsylvania, have invented certain new and useful Improvements in Fuel Devices for Internal-Combustion Engines, of which the following is a specification.

One object of my invention is to provide means for generating and collecting oxygen and ozone ($O_3$) so that the oxygen and ozone may be taken into an engine through the medium of the carburetor in order to stimulate and render a more perfect combustion.

Another object is to provide means of the above type which can be readily attached to the said intake opening of a carburetor and used in connection with gasoline or other fuel so as to economize in the use of said fuel.

These objects, and other advantageous ends which will be described hereinafter, I attain in the following manner, reference being had to the accompanying drawings in which Figure 1 is a front elevation showing my invention in a position adjacent a carburetor such for example as a carburetor used in connection with an internal combustion engine, Figure 2 is an enlarged transverse section taken on the line 2—2 of Figure 1, and Figure 3 is a fragmentary section taken on the line 3—3 of Figure 2 and showing the arrangement whereby the device can be secured to the air intake portion of the carburetor.

Referring to the drawings, 4 represents a carburetor which for example may be said to be attached to an internal combustion engine and 5 represents the air intake conduit of the carburetor. My invention as embodied in the present illustration includes a hood 6 which is closed at its top and sides and open to the atmosphere at its bottom as shown at 7. This hood tapers toward its outer end 8 and at its inner end is secured in embracing position relatively to the air intake conduit 5 of the carburetor by a clamping band 9. Thus a chamber 10 is provided by the hood 6 directly adjacent the mouth 11 of the air intake conduit 5 as clearly shown in Figure 3. A number of pairs of sparking electrodes 13 extend into the chamber 10; the electrodes of each pair having opposed sparking ends spaced apart as shown at 14 in Figure 2 so that when electric current is passed through said electrodes, sparks or arcs will be produced within the chamber 10 to create oxygen and ozone. These electrodes may be included in the circuit with the timer and spark plugs usually present in connection with an internal combustion engine and the electrodes may be insulated and supported in the opposite sides of the hood as shown in Figures 1 and 3. For example wires 15 which lead from the timer may be connected to the electrodes on one side while wires 16 which lead to the spark plugs may be attached to the opposite electrodes of the pairs. Thus during the operation of the engine a succession of sparks will be produced within the chamber 10 to create oxygen and ozone and at the same time to heat the air confined within the chamber 10 and this heated air combined with oxygen and ozone will be taken into the carburetor and engine to stimulate combustion when mixed with gasoline or other fuel and by having the air heated at the same time a more perfect mixture will be provided and the fuel will be caused to rapidly vaporize.

Any number of pairs of sparking electrodes may be placed within the chamber 10 of the hood and as illustrated I have shown four pairs of electrodes arranged in a row at various elevations and at the same time there is a free inlet of air into the hood through the opening 7 provided at the bottom.

In actual practice I have found that by the use of my device as above described I have been able to economize on gasoline and at the same time a more perfect combustion has been produced which is evidenced by increase of power and non-fouling of spark plugs and other parts of the engine.

In the use of my invention suction of the engine draws in the gas with the air which is unusually rich in oxygen and ozone and which is also heated to a certain extent and this mixture can be easily ignited and I am thus enabled to use a thinner mixture and at the same time secure great power.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including an intake passage; means providing a chamber directly open to the atmosphere and communicating with said passage; and means for creating electric sparks directly in said chamber whereby oxygen can be drawn directly into said chamber, from a zone of said atmosphere of greater volume than is capable of passing through said passage, and collect around said sparking means to be conveyed through said intake passage; substantially as described.

2. A device of the character described including an intake passage; and means for creating electric sparks outside of said passage in line with the suction therethrough whereby oxygen can be drawn from a zone of the atmosphere out of the line of suction through said passage and collected at a location in line with the suction through said passage so as to be drawn through the passage; substantially as described.

3. A device of the character described including an intake passage; means for creating electric sparks outside of said passage in line with the suction therethrough whereby oxygen can be drawn from a zone of the atmosphere out of the line of suction through said passage and collected at a location in line with the suction through said passage so as to be drawn through the passage; and means for providing a confining chamber for the collected oxygen before entering the passage; substantially as described.

4. In a fuel device for internal combustion engines a carburetor provided with an intake passage; a hood extending outwardly from the intake passage and having three closed sides and a side open to receive a volume of air greater than the capacity of the intake passage, and means for producing electric sparks within the hood.

5. In an electrical apparatus for enriching and igniting a combustible charge, the combination with an internal combustion engine having a carbureter thereon, and in circuit with an electrical ignition system, of a casing disposed on the air intake of said carbureter, and a plurality of spark plugs disposed in said casing and in circuit with said ignition system for producing sparks to produce ozone from air passing through the casing.

6. In an ozone generator, the combination with an internal combustion engine having a carbureter provided with an air inlet and with an electrical circuit, of a plurality of adjustable sparking devices for producing a maximum length spark to produce ozone for entrance into the air inlet of the carbureter.

7. In an electrical apparatus for enriching and igniting a combustible charge, the combination with an internal combustion engine, having a carbureter provided with an air inlet, and an ignition system, of a casing attached to the air inlet of a carbureter, provided with a plurality of oppositely disposed openings, adjustable sparking plugs disposed within said openings and said casing and in circuit with said ignition system for producing a plurality of sparks from the plugs upon one side of the casing to the plugs oppositely disposed upon the other side of the casing, and upon operation of the engine, to chemically alter the air currents passing into the carbureter to produce ozone.

8. In an electrical apparatus for enriching and igniting a combustible charge, the combination with an internal combustion engine having spark plugs, and having a carbureter provided with an air inlet, an ignition system, and a distributer, of a casing attached to the air inlet of the carbureter, adjustable spark plugs disposed within said casing, a pair of said last mentioned plugs being interposed in each circuit from the distributer to a particular spark plug of the internal combustion engine, to provide an adjustable sparking gap therebetween and in circuit with said ignition system for chemically altering air currents passing into the carbureter to produce ozone.

In testimony whereof I have signed my name to this specification in the presence of two subscribing witnesses.

ISAMI KODAMA.

Witnesses:
   CHAS. E. POTTS,
   AUGUSTUS B. COPPES.